(12) United States Patent (10) Patent No.: US 8,219,976 B2
Stuefe et al. (45) Date of Patent: Jul. 10, 2012

(54) MANAGING SETS OF ENTITIES

(75) Inventors: Thomas Stuefe, Gaiberg (DE); Eric Kass, Mannheim (DE)

(73) Assignee: SAP Aktiengesellschaft, Walldorf (DE)

( * ) Notice: Subject to any disclaimer, the term of this patent is extended or adjusted under 35 U.S.C. 154(b) by 863 days.

(21) Appl. No.: 12/346,525

(22) Filed: Dec. 30, 2008

(65) Prior Publication Data

US 2009/0138852 A1 May 28, 2009

Related U.S. Application Data

(63) Continuation of application No. 11/069,144, filed on Feb. 28, 2005, now abandoned.

(51) Int. Cl.
*G06F 9/44* (2006.01)
(52) U.S. Cl. ...................................... 717/123
(58) Field of Classification Search .......... 717/106–109, 717/114–117, 141–143, 169–172
See application file for complete search history.

(56) References Cited

U.S. PATENT DOCUMENTS

2002/0025085 A1 2/2002 Gustafson et al.

OTHER PUBLICATIONS

Olsen et al., "A Generic Bill of Materials based on a Programming Language Notation", 1995, Proceedings Norsk Informatikk-konferanse, 12 pages.*
Olsen et al., "A procedure-oriented generic bill of materials", 1997, Elsevier Science Ltd., Great Britain, 17 pages.*
Mitchell, "An Extensive Examination of Data Structures, Part 6: Efficiently Representing Sets", Microsoft Visual C# Developer Center, http://msdn.microsoft.com/vcsharp/default.aspx?pull=library/en-us/.., retrieved from the internet Nov. 1, 2004.
"Data Structure and Algorithms, Topic #24, Disjoint Set Structures", *McGill University: School of Computer Science, Winter 1997 Class Notes for 308-251B*, http://www.cs.mcgill.ca/~cs251/OldCourses/1997/topic24, retrieved from the internet Nov. 1, 2004.
Co/Create OneSpace Designer—BOM Editor, ©CoCreate Software GmbH & Co. KG (Sep. 2004)—(BOM_Editor_E).
"Definite Clause Grammars (DCGs)", http://www.amzi.com/manuals/amzi7/pro/ref_dcg.htm, retrieved from the internet Nov. 1, 2004
"Product and Vendor Solution Center: AIMMS—Optimization Modeling System by Paragon Decision Technology B.V.", http://knowledgestorm.techtarget.com/searchcio/Activity?Servlet?ks, retrieved from the internet Nov. 1, 2004.
Dautermann, et al., "ISETL Getting Started Guide", Dec. 2001.
"Chapter 9, Structured Data—Intermediate Techniques", http://www.arjay.bc.ca/Modula-2/Text/CH9/Ch9.html, retrieved from the internet Nov. 1, 2004.

(Continued)

*Primary Examiner* — Ted T Vo
(74) *Attorney, Agent, or Firm* — Fish & Richardson P.C.

(57) ABSTRACT

Methods and apparatus, including computer systems and program products, that implement a description language and a parser for a description language. A method includes receiving input including a specification of base items, a specification of contexts, and a specification of a selected context from the contexts. The method further includes generating an output set of items by evaluating the selected context. In that method, each item in the output set of items includes core attributes of a corresponding base item and can include attributes from a context. Generating an output set of items can include generating a specific bill of materials.

20 Claims, 4 Drawing Sheets

OTHER PUBLICATIONS

Lisp programming language, From Wikipedia, the free encyclopedia, http://en.wikipedia.org/wiki/Lips_programming_language, retrieved from the internet Nov. 1, 2004.

Blaha et al., "Bill-of-Material Configuration Generation", (1990), *IEEE*, pp. 237-244.

BOM (Bill-of-Materials) Editor, "Co/Create OneSpace Designer—BOM Editor", ©CoCreate Software GmbH & Co. KG (Sep. 2004), 1 page.

Roman Bartak, "Guide to Prolog Programming", [online], 1998 [retrieved on Nov. 1, 2004], 3 pages. Retrieved from the Intenet: <http://kti.mff.cuni.cz/~bartak/prolog/sets.html>.

Robert E. Kent, "The Information Flow Framework (IFF), Collected Papers 8:169", [online], Nov. 7, 2002 [retrieved on Oct. 26, 2005], 7 pages. Retrieved from the Internet: <http://suo.ieee.org/IFF>.

* cited by examiner

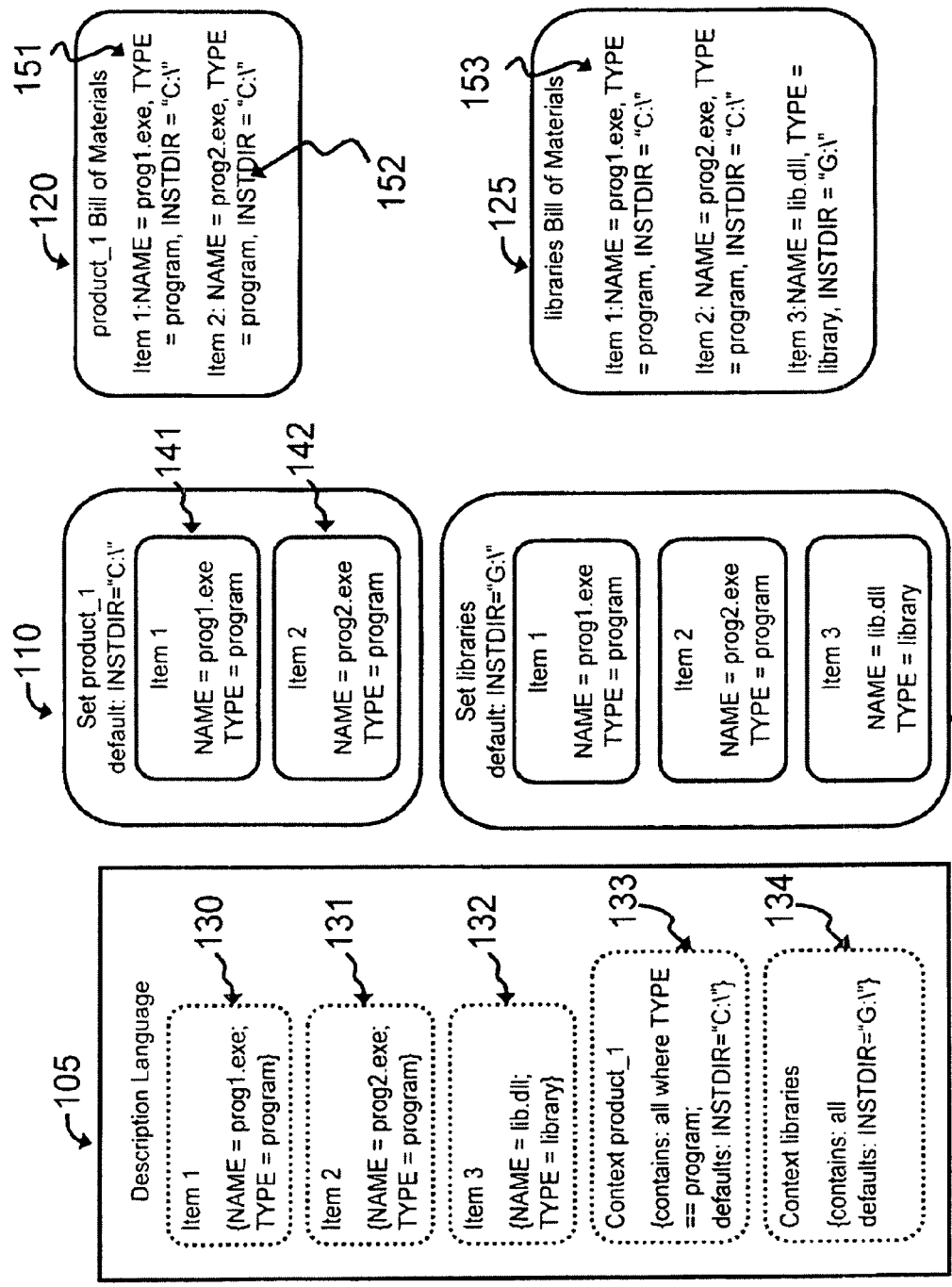

MANAGING SETS OF ENTITIES

CROSS-REFERENCE TO RELATED APPLICATIONS

This application is a continuation application of, and claims priority to U.S. application Ser. No. 11/069,144, filed on Feb. 28, 2005.

BACKGROUND

The following specification relates to a description language and parser for a description language.

There are several scenarios of building a software product where generating different versions of the software product based on some of the same components can be very efficient. For example, a global release of a software product can require that many different versions of the software product be generated, where each version incorporates, for example, different language components to account for language differences and the same non-language components.

To generate different versions of a software product such that some of the components are reused, a bill of materials for each version of the software product can be generated, and a selected bill of materials can be used at installation time to install a version of the software product. For example, one software product can have a bill of materials for an English version of the software product and a bill of materials for a French version of the software product. A compact disc that is distributed with all of the language components and non-language components can also include the two bills of materials. At installation-time, when a user decides to install an English version of the software product, a computer can read the English bill of materials to determine which software components to install, where those software components should be installed, and how they should be installed.

The process of generating bills of materials for software products can be a tedious and time-consuming process. For example, the process can involve generating manually a version of the bill of materials for each version of the software product. Such a process can include changing the software components to be used and changing the attributes of the software components that are reused in the bill of materials.

SUMMARY

Described herein are methods and apparatus, including computer program products, that implement a description language and a parser for a description language.

In one general aspect of the disclosure, the methods feature a machine implemented method of generating enriched sets of items. The method includes receiving input that includes a specification of base items, where each of the base items includes one or more core attributes and a value assigned to each core attribute; a specification of contexts; and a specification of a selected context from the contexts. In the specification of contexts, one or more of the contexts includes a definition selecting a set of items from the base items, one or more contexts, or both; and a definition selecting one or more additional attributes for one or more of the items in the set of items, where a value is assigned to each additional attribute. The method further includes generating an output set of items by evaluating the selected context. Evaluating the selected context includes evaluating a definition selecting a set of items for the selected context in order to generate the output set of items, and evaluating a definition selecting additional attributes for the selected context in order to determine which additional attributes and values of additional attributes are to be included in each item in the output set of items.

Implementations can include one or more of the following features. At least one of the contexts can include a definition of a specific bill of materials for a product and the selected context can include the definition of a specific bill of materials. Generating an output set of items can include generating a specific bill of materials from the definition of a specific bill of materials. Generating the product can include, including materials matching the output set of items according to attributes of the output set of items.

The definition selecting a set of items from the base items, one or more contexts, or both can include selection criteria that further defines the set of items to include or exclude one or more items from the base items, one or more contexts, or both. The definition selecting a set of items from the base items, one or more contexts, or both can include set operations to be used in combining sets of items from two or more contexts from the contexts. The definition selecting a set of items from the base items, one or more contexts, or both can include selection operations to be used in selecting items from the contexts.

The definition selecting one or more additional attributes can define a type of each of the additional attributes. The type of each of the additional attributes can be either a default type or an override type, where a default type additional attribute is overridden by a core attribute having a matching name, and an override type additional attribute overrides a core attribute having a matching name.

One of the contexts can essentially include a first definition selecting a set of items from the base items, one or more contexts, or both.

At least one of the base items can include one of a strong core attribute, one of a weak core attribute, or both. Strong core attributes can maintain their assigned value regardless of a context in which a base item resides and weak core attributes can be overridden by other attributes having a matching name and being inherited from a context.

Another aspect of the disclosure features a computer program product, stored on a machine-readable medium that includes instructions operable to cause a data processing apparatus to receive input including a specification of base items, where each of the base items includes one or more core attributes and a value assigned to each core attribute; a specification of contexts, where each of the contexts includes a definition selecting a set of items from the base items, one or more contexts, or both, and a definition selecting one or more additional attributes for one or more of the items in the set of items, and a value assigned to each additional attribute; and a specification of a selected context from the contexts The computer program product further includes instructions operable to generate an output set of items by evaluating the selected context, where evaluating the selected context includes evaluating a definition selecting a set of items for the selected context in order to generate the output set of items, and evaluating a definition selecting additional attributes for the selected context in order to determine which additional attributes and values of additional attributes are to be included in each item in the output set of items.

Implementations can include one or more of the following features. At least one of the contexts can include a definition of a specific bill of materials for a software product and the selected context can includes the definition of a specific bill of materials. The instructions operable to generate an output set of items can include instructions operable to generate a specific bill of materials from the definition of a specific bill of materials. The computer program product can further include instructions operable to generate the software product including the materials listed in the specific bill of materials.

The definition selecting the set of items from the base items, one or more contexts, or both can define the set to include or exclude one or more items from the base items or from sets of items of one or more of the contexts. The definition selecting the set of items from the base items, one or more contexts, or both can include selection criteria that defines the set of items to include or exclude one or more base items.

The definition selecting one or more additional attributes can define a type of each of the additional attributes. The type for each of the additional attributes can be either a default type or an override type, where a default type additional attribute is overridden by a core attribute having a matching name, and an override type additional attribute overrides a core attribute having a matching name.

Another aspect of the disclosure features a parser to perform tasks including receiving input that includes a specification of base items, where the base items include core attributes and values assigned to the core attributes; a specification of multiple contexts, where at least one of the contexts includes a definition selecting a set of items from the base items, one or more contexts, or both, and a definition selecting additional attributes for one or more of the items in the set of items; and a specification of a selected context to evaluate. The parser further performs tasks including generating a list of enriched items by evaluating the selected context. Generating the list of enriched items includes, for the selected context, evaluating a definition of a set of items in order to generate the list of enriched items, and evaluating a definition of additional attributes of the selected context in order to determine which additional attributes and values of additional attributes are to be included in each of the enriched items, where core attributes of an item are included in a corresponding enriched item, and some of the core attributes of an enriched item are assigned values from the additional attributes of the selected context.

Implementations can include one or more of the following features. The selected context can reference one or more additional contexts and generating a list of enriched items can include evaluating the additional contexts referenced in the selected context.

Additional attributes can be either of a type default or of a type override. A value of an additional attribute defined for the selected set of items might not included in the context if there is a core attribute that has a matching name and the attribute of the context is a default type attribute. A value of an additional attribute defined for the selected set of items can be included in the context if there is a core attribute that has a matching name and the attribute of the context is an override type attribute.

The mechanisms and techniques described here may provide one or more of the following advantages. Contexts that include sets of items and attributes can be defined using a description language, and a parser can be used to generate enriched sets of items that correspond to an evaluated context. For example, a specification can be drafted (e.g., written) that includes products, materials for those products, and attributes of the products and materials; and a bill of materials can be generated from that specification.

Sets of enriched items that result from the parser can be configured to be machine-readable such that products, such as software products, can be automatically generated based on a bill of materials.

The description language allows sets of items to be freely defined. The description language can be easily readable as describing a set of enriched items as contexts and items, in a set-oriented approach with selection criteria, can be less cluttered than drafting the set of enriched items with all attributes and items. The description language can provide an interface between a human-preferable description language and a language that is usable by a machine to generate products based on a bill of materials.

The description language can be used for scenarios, other than a bill of materials scenario, to represent dynamic sets of items. For example, the description language can be used to maintain user authorities in computer systems. In an example implementation that uses role-based authorization, roles can be defined as contexts, resources can be defined as items, and user permission information (e.g., can read, modify, print, etc.) can be defined as item attributes. In that implementation, a role can be evaluated to determine whether a user with the corresponding role can access the resource and to determine which types of permissions the user has.

Details of one or more implementations are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

FIGS. 1A-1C illustrate various representations of example contexts and sets of items.

DETAILED DESCRIPTION

Figure 1D:
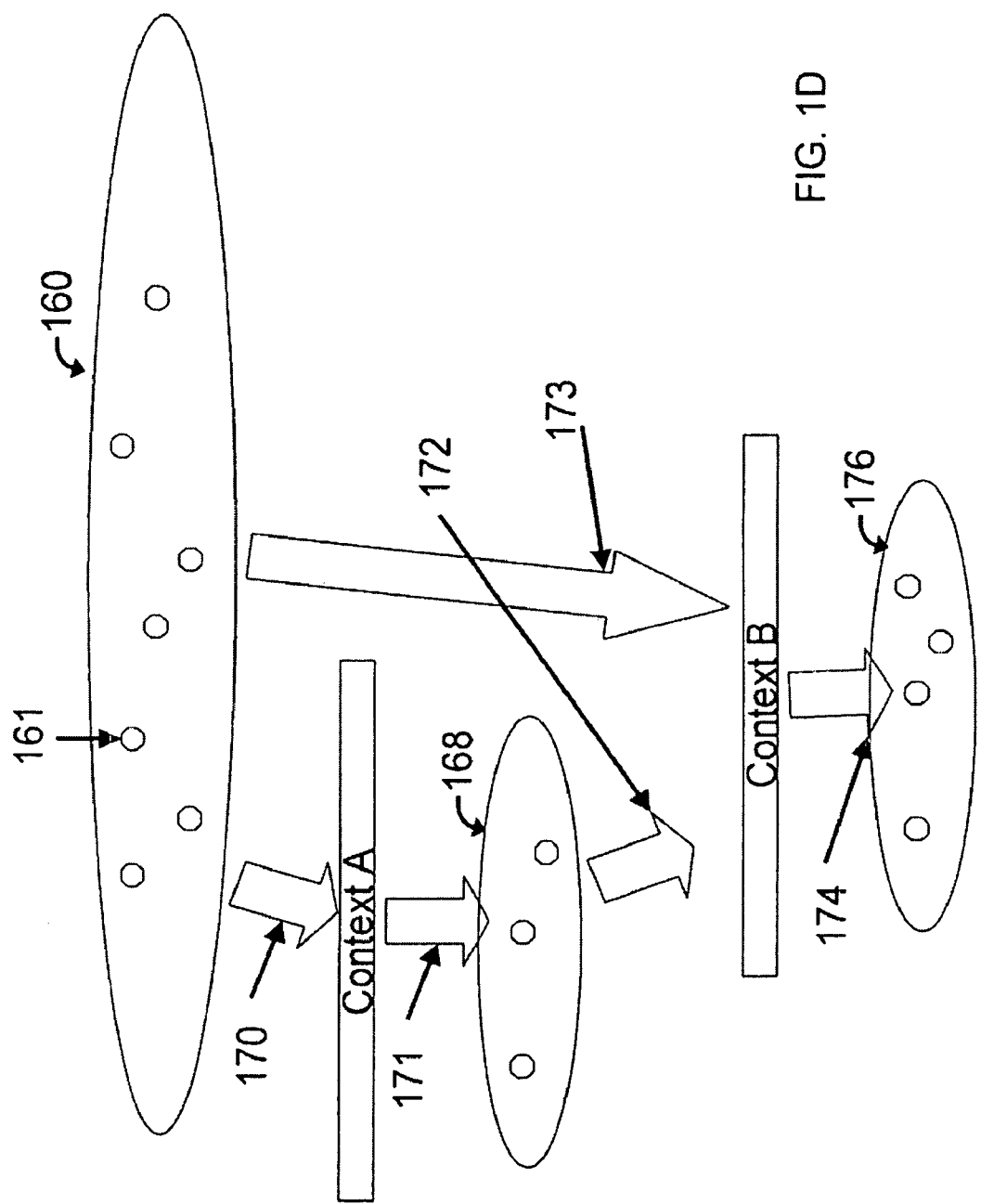
FIG. 1D is a graphical representation of example contexts and sets of items according to an example description language.

A description language (e.g., a programming language) can be defined to describe sets of items based on the attributes of the items and the attributes of a context, and a corresponding parser can be used to interpret the description language and generate an enriched list of items for a specific context (or set) that includes attributes from the items and attributes from the contexts. The description language can be defined such that references of sets and items are used to define members of a set. By defining members of a set with references, rather than definitions of all of the members of set within each set, definitions of the items and sets can be reused easily, and persons who draft a specification of sets and items can draft in a set-oriented language in which the persons need not worry about laboriously filling in the sets, items, and attributes for a set.

FIGS. 1A-C illustrate various representations of example contexts and sets of items. FIG. 1A illustrates a representation 105 of contexts and sets of items according to an example description language that defines items to include attributes and contexts for the items. FIG. 1B illustrates a graphical representation of sets of items including sets 110, 115 of items. FIG. 1C illustrates a representation including enriched sets 120, 125 of items. The representations of FIGS. 1A-1C define the same example sets of items. The example sets of items correspond to example software components, including a software product named "product_1." The example sets define a software component by defining files that make up a software component and attributes of the files (e.g., what type of file and where a file should be installed).

The representation 105 of FIG. 1A defines items 130, 131, 132 and contexts 133, 134 according to the example description language. Dotted lines are used to illustrate the definition of an item or context that belongs to each item and each context. The representation 105 can be a representation of a specification (e.g., a text document) that includes the definition of contexts and items, In the example description language used to define the representation 105, each of the definitions of an item defines a single unit (e.g., an entity). For example, the definitions of the items 130, 131, 132 define files of a software product.

According to the description language, definitions of items can include attributes and attributes can have corresponding values assigned to them. For example, each of the definitions of items 130, 131, 132 of FIG. 1A includes attributes identified as "NAME" and "TYPE". The definitions of items 130, 131, 132 have values "prog1.exe", "prog2.exe", and "lib.dll", respectively, for the attribute NAME, and values "program", "program", and "library", respectively, for the attribute TYPE. Attributes can be freely defined such that any type of attribute that is desired can be defined for an item. In some implementations attributes can be declared as certain data types (e.g., string, boolean, integer, and the like). For example, the attribute NAME could be declared to be a string by the expression "STRING TYPE=library."

According to the example description language, contexts define a set of items. A set of items can include no items or all of the items. To define a set of items, the example description language defines that the term "all" can be used to define that all items defined in the specification are included in a context. Other types of techniques for defining a set of items can be supported by the example description language. For example, according to the example programming language, items of a set can be defined as a list of items (e.g., "Item 1, Item 2"). As another example, a term "excludes" can be used to exclude items from a context. For example, the definition:

---

```
context context1{
    contains: all
    excludes: item 3
}
```

--- can define a context1 to include all items except item 3.

As another example, a term (also referred to as a selection operation) "itemsfrom" can be used in conjunction with a name of a context (e.g., itemsfrom samplecontext) to define that items from another context should be included in the set of items. Using this term, nested sets can be defined. In addition to including items, the attributes of those items are included. Also, the attributes a context can be included, by default, in the items that are from the nested items. As an example, a context named contextA can be defined to include all items from a context B. If context A were to be evaluated, the items from context B would include all the attributes of context A and context B, and the items of context A would only include the attributes of context A. In alternative implementations, attributes from the context in which the other items are defined to exist are not included (following the earlier example, attributes of context A are not included in the items from context B). In some implementations, a special term need not be used to include items from another context (e.g., itemsfrom need not be used). As an example, the "all" term can be defined to include all items and all items from all contexts (and including attributes from other contexts).

Also, to define a set of items, set operations, such as union, intersection, and the like can be used across multiple contexts. For example, a set can be defined to include the union of items from multiple contexts, such as a context1 and a context2 (e.g., itemsfrom context union context2).

To further define a set of items, the example description language defines that selection terms and selection criteria can be used to restrict the items that should be included. For example, the context "product_1" is defined by the selection term "where" and the criteria "TYPE=program" to only include items that have an attribute "TYPE" assigned the value "program." The description language can support complex selection criteria and boolean operators. As an example, the description language can support the selection criteria "contains: item 1-item 3 where (TYPE==program or TYPE==library) and version<5", which can be interpreted as defining a set to include all items between the names item 1 and item 3 that include an attribute TYPE assigned program or library, and an attribute version that is less than 5.

In addition to defining a set of items, a context defines attributes of the set of items. For example, the context "product_1" includes the attribute "INSTDIR" which defines an installation directory and is assigned the value "C:\". Attributes of a set of items apply to all of the items defined by the context. For example, the attribute "INSTDIR" applies to all of the items in the set defined to be part of the context "product_1" such that each of the items "Item 1" and "Item 2" of the context "product_" has the attribute "INSTDIR" defined as "C:\". Thus, items inherit attributes from the context in which they are defined and can inherit attributes from other contexts in which they are nested (e.g., any number of levels of nesting of items within contexts can result in any number of attributes added to an item). As an example, there can be an item "Item 1" with attributes A and B, and two contexts, C and C2, where each of the contexts is defined to include Item 1 and the contexts C1 and C2 include the attributes C and D, respectively. In that example, C1 includes Item 1, which inherits the attribute C, such that Item 1 of C1 would have the attributes A, B, and C. C2 also includes Item 1; however, Item 1 of C2 inherits the attribute D, such that Item 1 of C2 has the attributes A, B, and D. If the example changed such that C2 included Item 1 and C 1, C2 would include an Item 1 with attributes A, B, and D, and an Item 1 with attributes A, B, C, and D. The second Item 1 and its attributes would result from the nesting of C1. If the example with the changed C2 changed again such that there was also a context C3 that included the context C2 and an attribute E, C3 would include an item 1 with attributes A, B, C, and E and an Item 1 with attributes A, B, C, D, and E, where D and E result from the multiple levels of nesting the second Item 1. In alternative implementations, the nesting of items might not result in multiple items with a same name. As an example, the example context C3 might only include a single Item 1 of C3 with the attributes A, B, C, D, and E, instead of the context C3 include two different Item 1's.

Because definitions of contexts and items can have attributes with a matching name (e.g., both can have an attribute TYPE), the example description language defines two types of attributes of a context, a first type that overrides attributes of an item and a second type that can be overridden by a matching attribute of an item. The two types of attributes are referred to as override attributes and default attributes, respectively. Thus, for example, if an item has an attribute INSTDIR assigned the value "C:\", a context that includes that item has an override attribute INSTDIR assigned the value "G:\", and the context is chosen to be evaluated, a resulting set would include the item with the value "G:\" assigned to the attribute INSTDIR. By contrast, if the attribute of the context was a default attribute instead of an override attribute, a resulting set would include the item with the value "C:\" assigned to the attribute. In alternative implementations, other techniques can be used to deal with a conflict between an attribute of a context and an attribute of an item. For example, attributes of a context might always be overridden by attributes of an item. To differentiate between attributes of a context and attributes of an item, attributes of an item can be referred to as "core attributes." In some implementations, items can be defined to include attributes that can be overridden by attributes of a context and attributes that cannot be overridden by attributes of a context. The attributes that can be overridden might be referred to as "weak attributes" and the attributes that cannot be overridden might be referred to as "strong attributes." In that manner, the ability of an attribute to be overridden can be defined on a per-item basis rather than on a per-context basis. As an example, if the example description language were used to describe user-rights and resources (e.g., a file, hardware resource, software resource, and the like) were described as items, a single resource for which there should be no write access can be described as

```
Item resource1 {
    strong Write_Access = false
}
```

In that example, the value "false" for the attribute Write_Access would not be overridden by any context in which resource1 is defined to be included (e.g., a context with "Write_Access=true" that includes resource1 could not change the value of Write_Access for resource1).

Like the definition of a set of items in a context, the definition of attributes for a context can include selection terms and selection criteria to define items that should include additional attributes defined by the context. For example, in the definition:

```
context samplecontext {
    contains: all
    defaults:
        all where TYPE = = program
            INSTDIR = "C:\"
}
``` the attribute INSTDIR of the context samplecontext is limited to being included in items that have the attribute TYPE assigned the value program because of the selection term "where" and the selection criteria "TYPE==program".

In contrast to including reusable definitions that define contexts and items, FIG. 1B graphically depicts sets 110, 115 to include items. The sets 110, 115 of FIG. 1B correspond to the sets defined by the contexts 133, 134 of FIG. 1A. For example, the context "product_1" is defined to contain Items 1 and 2 (130, 131) (as "contains: all where TYPE==program") and the set 110 graphically includes Items 1 and 2 (141, 142). As shown by the contrast between the context libraries 134 and the corresponding set (set libraries 115), the graphically depicted sets include all of the definitions of items within a set, whereas a context drafted according to the description language need only contain a definition of a subset of the items to be included in a context (where a subset can include all of the items). Thus, contexts can be efficiently defined because they can reuse definitions of items. In addition, definitions of contexts can be modified easily and different versions of a context can be made easily because selection criteria can be used and the definitions can be reused. As an example, context definitions could include a definition of items with all the respective attributes for items, as shown in the bill of materials 125. In that example, removing an attribute from all of the items can involve tediously going through each definition of an item to prune out the attribute. By contrast, with the example description language, only the definition of the attributes in the context need be changed to remove the attribute. A change to the definition of the attributes in the context could then be inherited by the items defined to be in the context. As another example, if a user desired to change the attribute TYPE of base items 130, 131, 132 for the context 134, the user could add an attribute named TYPE with the value "executable" of type override to the definition of the context 134. In that example, if the changed context is evaluated, each enriched item corresponding to the items 130, 131, 132 would have the value "executable" assigned to the attribute TYPE.

Like the graphically depicted sets 110, 115, the enriched sets 120, 125 of items include definitions of all of the items. The enriched sets 120, 125 of items also include all of the attributes of a corresponding context. For example, the enriched item 153 includes the attribute INSTDIR of the context libraries 134. The enriched sets of items 120, 125 are bills of materials, where each item in a bill of material corresponds to an item to be included in a product. For example, a product defined by the bill of materials product_1 (the first enriched set 120) includes a first item 151, prog1.exe, and a second item 152, prog2.exe. The attributes for each of the items 151, 152 can be used for any purpose. For example, the attribute INSTDIR can be used to define a directory where the items 151, 152 of the software product defined by the bill of materials for product_1 (the first enriched set 120) are to be installed.

Although certain semantics and constructs were used in the example description language, in alternative implementations other semantics and constructs can be used. For example, although "all" was used to define the sets in a context, in some implementations additional and/or different techniques can be used to define set of items in a context. For example, items can be listed as "Item 1, Item 2, Item 3," items can be selected as a range of items as "Item 1-Item 3", and the like. Also, in alternative implementations, additional and/or different techniques can be used to select items and/or attributes. For example, although "where" was used to select a subset of all of the programs, other suitable techniques, such as "not" can be used (e.g., "not TYPE==library").

FIG. 1D is a graphical representation of example contexts Context A and Context B, and sets of items 160, 168, 172 according to an example description language. The arrows 170, 171, 172, 173, 174, in FIG. 1D illustrate a logical flow of items from the base items 160, through one or more contexts, and into a resultant set of items, such as the second or third set of items 168, 176, respectively. The example description language can be the example description language discussed in connection with FIG. 1A.

In the example description language of FIG. 1D, contexts, such as the context "Context A" define a selection of items and can define attributes that should be added to one or more of the selected items. For example, Context A defines a selection of three items from the base set of items 160. Were Context A to be evaluated, the evaluation of Context A would result in the second set of items 168. As another example, Context B defines a selection of items from Context A and from the base set of items 160 (as shown by the arrows 171, 172, 173 pointed towards Context B). Were Context B to be evaluated, it would result in the third set of items 176.

In the example description language, items, such as the item 161 of the first set of items 160, are defined to have attributes. In addition, contexts, such as the contexts Context A and Context B, can define a selection of additional attributes for one or more of the items selected by the respective context. For example, Context B can include a definition selecting additional attributes that selects two items from the base items 160 that should have an additional attribute CONSTDIR that is assigned the value "C:\" (e.g., items 1, 2 from Context B include CONSTDIR=C:\).

As contexts can be nested, so can the inheritance of attributes from nested contexts. For example, additional attributes of items selected in the Context A could be included in the third set of items 176, as a result of an evaluation of Context B. As an example, Context A could select an item "resource" from the base items 160, Context A could include a definition of an additional attribute "share_access," and Context B could select the item resource. In that example, the item resource and the additional attribute share_access would be included in the second set 168 that results from the evaluation of Context A, and that item and the additional attribute share_access would be included in the third set of items 176 that results from the evaluation of Context B.

Figure 2:
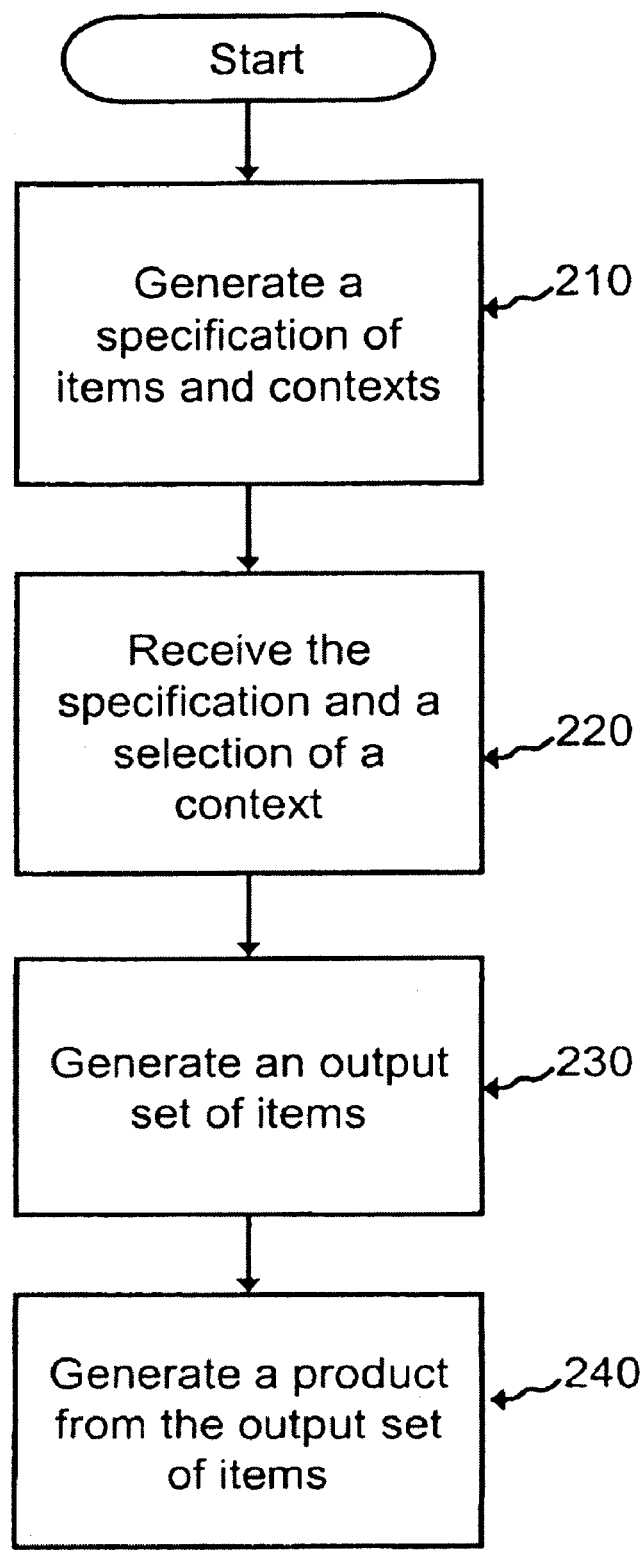
FIG. 2 is a flowchart of a sample process of generating bills of materials.
Figure 3:
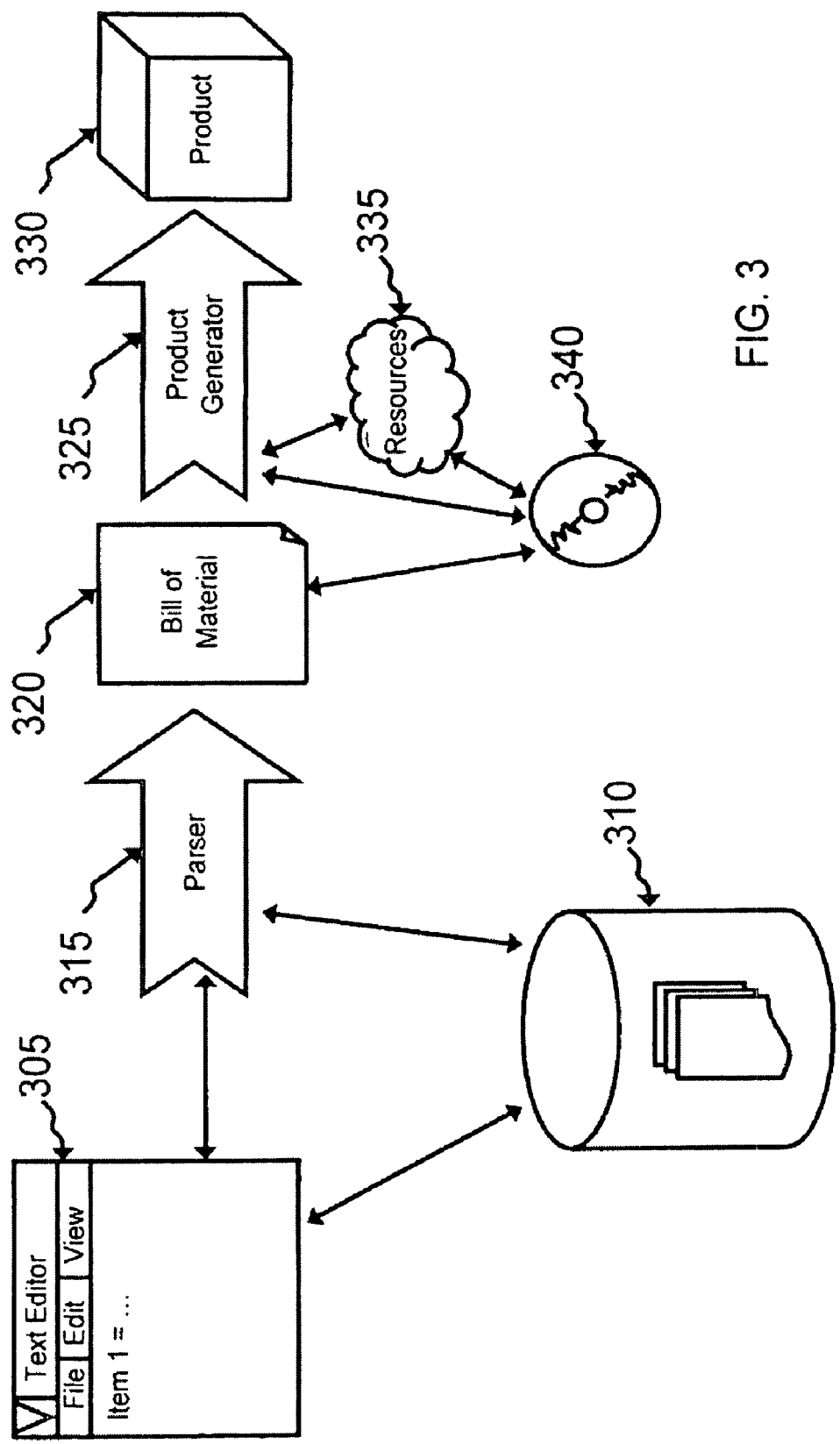
FIG. 3 includes a diagram of a product generating system that uses a description language to represent bills of materials.

FIG. 2 is a flowchart of a sample process of generating bills of materials and FIG. 3 includes a diagram of a product generating system that uses a description language to represent bills of materials. As the sample process in the flowchart of FIG. 2 can be used in the system of FIG. 3, FIGS. 2 and 3 will be discussed together.

The product generating system includes a text editor 305, a storage device 310, a parser 315, and a product generator 325. In general, products are generated in the product generating system in a process where a user drafts a specification with the text editor 305, which can be stored in the storage device 310; the parser 315 generates a bill of materials 320 from the specification; and the product generator 325 uses the bill of materials 320 to generate a product 330. Alternatively, any other type of editor could be used to generate sets of items according to the description language. For example, a mouse-driven graphical user interface editor could be used. In that example, dragging and dropping actions could be used to define sets of items and attributes of an item. For example, an item "Item I" could be dragged and dropped into an area that defines a context C1, and the editor can use that information to build a definition of items in the context C1 that includes Item 1.

At 210, a specification of items and contexts is generated. The specification can be drafted by a person using a text editor. For example, the text editor 205 is used to generate specifications that include definitions of a base set of items (one to n items, where n is any positive integer greater than one) and one or more contexts. The specifications are drafted in accordance with a description language, such as the example description language described in reference to FIGS. 1A-1C. The description language used to draft specifications in FIGS. 2 and 3 defines that items can include attributes (0 to m attributes, where m is any positive integer), and contexts define a subset of the items (1 to the number of base items) and can include attributes (0 to p, where p is a positive integer) for the set of items. In addition, both the definition of the set of items and the attributes for a context can be defined by selection criteria. Because a user can define freely contexts, items, and attributes, the description language offer freedom and flexibility. For example, a bill of material including any combination of materials can be defined. The description language is used to generate static definitions of sets of items such that a set, once defined by the text editor 105, static (unless, e.g., the text is changed). For example, once a set is defined and selected to be evaluated, the evaluation of the set does not allow for input, such as choices between different values of attributes or items within a set, such that different versions of the selected set can be generated.

A parser, such as the parser 315, receives the specification of contexts and items and also receives a specification of a context to evaluate (e.g., a selected context or contexts) at 220. The parser generates an enriched set (or list) of items (e.g., an output set of items) at 230.

The items in the enriched set are all the items that were defined to be included in the context that was to be evaluated (e.g., the selected context) and can include items from other contexts. Each of the enriched items includes attributes that were defined to be in a corresponding item, which can include core attributes, default attributes of a context, and/or override attributes of a context (depending on the definition of the description language and the definition of the context). The output can be a specific bill of materials (e.g., a bill of materials for a specific product), such as the bill of materials 320. The bill of materials 320 can be a bill of materials for a software product where each item in the bill of materials corresponds to a resource, and attributes of the items define how resources should be combined and/or installed to generate the software product.

As part of evaluating the context, the parser can interpret (e.g., parse) the specification of contexts and items and determine which contexts and items from the base set of items belong in the context that was selected to be evaluated. In addition, the parser can determine which attributes should be included in items that are in the context being evaluated. Also, the parser can determine what values should be assigned to those attributes. To evaluate the context, the parser can iterate through the context that was specified and contexts (if any) that are referenced in that context, down any number of levels of nested contexts and determine which items, attributes, and/or attribute values should be included in the enriched set of items.

At 240, a product can be generated from the output set of items. For example, a software product 330 can be generated from the bill of materials 320 by the product generator 325. The product generator 325 can be a piece of software that uses the bill of materials 320 and resources 335 as input, and interprets the bill of materials to 320 determine how to install a software product (e.g., generate the software product 330). The product generator 325, the resources 335, and the bill of materials 320 can be stored on a machine-readable medium, such as the compact disc 340, for installation on a computer system (alternatively, they can be downloaded). The compact disc 340 can include any number of bills of materials, and a user of a computer system can select from the bills of materials on the compact disc 340 to choose a version of a software product to install.

Although the description language is discussed in reference to FIGS. 1A-1D, 2, and 3 in the context of describing bills of materials, the description language can be used for scenarios to represent dynamic sets of items. For example, the description language can be used to maintain user authorities in computer systems. In one implementation that uses role-based authorization, roles can be defined as contexts, resource can be defined as an item, and user permission information (e.g., can read, modify, print, etc.) can be defined as item attributes. In that implementation, a role can be evaluated to determine if a user with the corresponding role can access the resource and the types of permissions the user can have.

The disclosed subject matter and all of the functional operations described herein can be implemented in digital electronic circuitry, or in computer software, firmware, or hardware, including the structural means disclosed in this specification and structural equivalents thereof; or in combinations of them. The disclosed subject matter can be implemented as one or more computer program products, i.e., one or more computer programs tangibly embodied in an information carrier, e.g., in a machine-readable storage device, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network. Data for a computer program can be stored in a file.

The processes and logic flows described herein can be performed by one or more programmable processors executing one or more computer programs to perform functions of the disclosed subject matter by operating on input data and generating output. The processes and logic flows can also be performed by, and apparatus of the disclosed subject matter can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the disclosed subject matter can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed subject matter can be implemented in a computing system that includes a back-end component (e.g., a data server), a middleware component (e.g., an application server), or a front-end component (e.g., a client computer having a graphical user interface or a Web browser through which a user can interact with an implementation of the disclosed subject matter), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Other implementations may be within the scope of the following claims.

What is claimed is:

1. A computer implemented method for generating lists associated with respective computer program products, comprising:

providing a plurality of items, each item of the plurality of items being uniquely identified by an identifier and comprising at least one core attribute, the at least one core attribute being of a variable data type;

defining a first context that describes a first set of items from the plurality of items, and that can describe a first other context, the first context including at least one of a first default context attribute and a first overriding context attribute, the first other context comprising one or more items of the first set of items;

defining a second context that describes a second set of items from the plurality of items, and that can describe a second other context, the second context including at least one of a second default context attribute and a second overriding context attribute, the second other context comprising one or more items of the second set of items;

generating a description language based on the first and second contexts;

evaluating the description language based on the first context;

generating a first list as a sub-set of items of the plurality of items based on the first context, wherein the first default context attribute is assigned to at least one item of the first list if the at least one item does not include a corresponding attribute, and wherein the first overriding context attribute replaces a corresponding core attribute of at least one item of the first list if the corresponding core attribute conflicts with the first overriding core attribute, the first list being associated with a first version of a software product; and displaying the first list.

2. The computer implemented method of claim 1, further comprising:

evaluating the description language based on the second context;

generating a second list as a sub-set of items of the plurality of items based on the second context, wherein the second default context attribute is assigned to at least one item of the second list if the at least one item does not include a corresponding attribute, and wherein the second overriding context attribute replaces a corresponding core attribute of at least one item of the second list if the corresponding core attribute conflicts with the second overriding core attribute, the second list being associated with a second version of a software product; and displaying the second list.

3. The computer implemented method of claim 1, wherein the first and second contexts each explicitly exclude certain items from the plurality of items.

4. The computer implemented method of claim 1, wherein at least one of the first and second contexts comprises a definition of a specific bill of materials for a corresponding first and second computer program product.

5. The computer implemented method of claim 4, further comprising:
generating a computer program product comprising components matching components provided in the first list.

6. The computer implemented method of claim 1, further comprising:
defining at least one of the first context and the second context based on a value of a core attribute of each of the items of the plurality of items.

7. The computer implemented method of claim 1, wherein at least one of the first context and the second context is defined based on identifiers of each item of the plurality of items.

8. A non-transitory computer-readable storage medium encoded with a computer program comprising instructions that, when executed, operate to cause a computer to perform operations comprising:
providing a plurality of items, each item of the plurality of items being uniquely identified by an identifier and comprising at least one core attribute, the at least one core attribute being of a variable data type;
defining a first context that describes a first set of items from the plurality of items, and that can describe a first other context, the first context including at least one of a first default context attribute and a first overriding context attribute, the first other context comprising one or more items of the first set of items;
defining a second context that describes a second set of items from the plurality of items, and that can describe a second other context, the second context including at least one of a second default context attribute and a second overriding context attribute, the second other context comprising one or more items of the second set of items;
generating a description language based on the first and second contexts;
evaluating the description language based on the first context;
generating a first list as a sub-set of items of the plurality of items based on the first context, wherein the first default context attribute is assigned to at least one item of the first list if the at least one item does not include a corresponding attribute, and wherein the first overriding context attribute replaces a corresponding core attribute of at least one item of the first list if the corresponding core attribute conflicts with the first overriding core attribute, the first list being associated with a first version of a software product; and
displaying the first list.

9. The non-transitory computer-readable storage medium of claim 8, wherein the operations further comprise:
evaluating the description language based on the second context;
generating a second list as a sub-set of items of the plurality of items based on the second context, wherein the second default context attribute is assigned to at least one item of the second list if the at least one item does not include a corresponding attribute, and wherein the second overriding context attribute replaces a corresponding core attribute of at least one item of the second list if the corresponding core attribute conflicts with the second overriding core attribute, the second list being associated with a second version of a software product; and
displaying the second list.

10. The non-transitory computer-readable storage medium of claim 8, wherein the first and second contexts each explicitly exclude certain items from the plurality of items.

11. The non-transitory computer-readable storage medium of claim 8, wherein at least one of the first and second contexts comprises a definition of a specific bill of materials for a corresponding first and second computer program product.

12. The non-transitory computer-readable storage medium of claim 11, wherein the operations further comprise:
generating a computer program product comprising components matching components identified in the first list.

13. The non-transitory computer-readable storage medium of claim 8, wherein the operations further comprise:
defining at least one of the first context and the second context based on a value of a core attribute of each of the items of the plurality of items.

14. The non-transitory computer-readable storage medium of claim 8, wherein at least one of the first context and the second context is defined based on identifiers of each item of the plurality of items.

15. A system comprising:
one or more computers; and
a computer-readable medium coupled to the one or more computers having instructions stored thereon which, when executed by the one or more computers, cause the one or more computers to perform operations comprising:
providing a plurality of items, each item of the plurality of items being uniquely identified by an identifier and comprising at least one core attribute, the at least one core attribute being of a variable data type;
defining a first context that describes a first set of items from the plurality of items, and that can describe a first other context, the first context including at least one of a first default context attribute and a first overriding context attribute, the first other context comprising one or more items of the first set of items;
defining a second context that describes a second set of items from the plurality of items, and that can describe a second other context, the second context including at least one of a second default context attribute and a second overriding context attribute, the second other context comprising one or more items of the second set of items;
generating a description language based on the first and second contexts;
evaluating the description language based on the first context;
generating a first list as a sub-set of items of the plurality of items based on the first context, wherein the first default context attribute is assigned to at least one item of the first list if the at least one item does not include a corresponding attribute, and wherein the first overriding context attribute replaces a corresponding core attribute of at least one item of the first list if the corresponding core attribute conflicts with the first overriding core attribute, the first list being associated with a first version of a software product; and displaying the first list.

16. The system of claim 15, wherein the operations further comprise:

evaluating the description language based on the second context;

generating a second list as a sub-set of items of the plurality of items based on the second context, wherein the second default context attribute is assigned to at least one item of the second list if the at least one item does not include a corresponding attribute, and wherein the second overriding context attribute replaces a corresponding core attribute of at least one item of the second list if the corresponding core attribute conflicts with the second overriding core attribute, the second list being associated with a second version of a software product; and displaying the second list.

17. The system of claim 15, wherein the first and second contexts each explicitly exclude certain items from the plurality of items.

18. The system of claim 15, wherein at least one of the first and second contexts comprises a definition of a specific bill of materials for a corresponding first and second computer program product.

19. The system of claim 18, wherein the operations further comprise:

generating a computer program product comprising components matching components provided in the first list.

20. The system of claim 15, wherein the operations further comprise:

defining at least one of the first context and the second context based on a value of a core attribute of each of the items of the plurality of items.

* * * * *